(12) United States Patent
Grethel et al.

(10) Patent No.: US 7,914,269 B2
(45) Date of Patent: Mar. 29, 2011

(54) GEAR PUMP FOR ACTUATING A CLUTCH

(75) Inventors: Marco Grethel, Bühlertal (DE); Oswald Friedmann, Lichtenau (DE); Christoph Vetter, Karlsruhe (DE); Eric Müller, Kaiserslautern (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 690 days.

(21) Appl. No.: 11/821,587

(22) Filed: Jun. 23, 2007

(65) Prior Publication Data

US 2008/0014107 A1    Jan. 17, 2008

Related U.S. Application Data

(63) Continuation of application No. PCT/DE2005/002201, filed on Dec. 7, 2005.

(30) Foreign Application Priority Data

Dec. 23, 2004    (DE) .......................... 10 2004 061 956

(51) Int. Cl.
*F01C 21/00*    (2006.01)

(52) U.S. Cl. ..................................... 418/69; 192/48.619

(58) Field of Classification Search ..................... 418/69; 475/88; 192/48.601, 48.602, 48.609, 48.619
See application file for complete search history.

(56) References Cited

U.S. PATENT DOCUMENTS

| | | | | |
|---|---|---|---|---|
| 3,970,176 | A * | 7/1976 | Bucksch | 192/48.619 |
| 4,566,295 | A | 1/1986 | Mason et al. | 68/12.01 |
| 5,310,388 | A * | 5/1994 | Okcuoglu et al. | 475/88 |
| 5,749,801 | A | 5/1998 | Teraoka et al. | 475/88 |
| 6,238,315 | B1 * | 5/2001 | Morse et al. | 475/88 |
| 6,523,657 | B1 * | 2/2003 | Kundermann et al. | 192/48.619 |
| 7,234,579 | B2 * | 6/2007 | Grethel et al. | 192/48.619 |

FOREIGN PATENT DOCUMENTS

DE    38 27 573 A1    2/1990

* cited by examiner

*Primary Examiner* — Thomas E Denion
*Assistant Examiner* — Mary A Davis
(74) *Attorney, Agent, or Firm* — Alfred J. Mangels

(57) ABSTRACT

A positive-displacement pump having an eccentrically positioned internal ring gear and pinion within a pump housing. Pressurized operating fluid is provided by the pump to actuate an actuation piston of a clutch unit, such as a double clutch unit. The clutch unit is drivingly coupled with the pump for movement between engaged and disengaged positions. At least one throughbore is provided in the pump housing within which throughbore the clutch actuation piston is guided.

12 Claims, 2 Drawing Sheets

GEAR PUMP FOR ACTUATING A CLUTCH

CROSS-REFERENCE TO RELATED APPLICATION

This is a continuation of International Application Serial No. PCT/DE2005/002201, with an international filing date of 7 Dec. 2005, and designating the United States, the entire contents of which is hereby incorporated by reference to the same extent as if fully rewritten.

BACKGROUND OF THE INVENTION

The present invention concerns a positive-displacement pump, especially an internal gear pump including a pump housing in which an operating fluid is acted upon by pressure to move at least one actuation element, especially an actuation piston, of a clutch unit, especially a double clutch unit, which is connected drive-wise with the positive-displacement pump, from an engaged position into a disengaged position. The invention also concerns a positive-displacement pump in which a pump element, especially a pump pinion, is rotatably arranged in the pump housing. The invention also concerns a clutch unit, especially a double clutch unit, for arrangement in a power train of a motor vehicle between a drive unit and a transmission.

An object of the invention is to provide a positive-displacement pump, especially an internal gear pump, requiring less overall space than conventional positive-displacement pumps. The pump includes a pump housing in which an operating fluid is acted upon by pressure, to move at least one actuation element, especially an actuation piston of a clutch unit, especially a double clutch unit. The clutch unit is coupled drive-wise with the positive-displacement pump for movement from an engaged position into a disengaged position, where a pump element, especially a pump pinion, is rotatably mounted in the housing.

SUMMARY OF THE INVENTION

The object is achieved by a positive-displacement pump, especially an internal gear pump, with a pump housing in which an operating fluid is acted upon by pressure to move at least one actuation element, especially an actuation piston, of a clutch unit, especially a double clutch unit, from an engaged into a disengaged position. At least one throughbore is provided in the pump housing in which the actuation element is guided. In that way, radial structural space can be saved. Preferably, with the throughbore it is a matter of a throughbore which is arranged radially outside a pump element, for example a pump pinion, or radially outside a pump ring gear. With the clutch unit, it is preferably a matter of a wet-running clutch arrangement, especially a disk clutch arrangement, which can be actuated with the aid of the operating fluid provided by the positive-displacement pump to the actuation element.

A preferred embodiment of the positive-displacement pump is characterized in that in each case two throughbores are combined in pairs and evenly distributed over the periphery of the pump housing for accommodating actuation pistons which are associated with various clutch arrangements. Preferably, three times two, thus six throughbores are evenly distributed over the periphery of the pump housing.

A further preferred embodiment of the positive-displacement pump is characterized in that the pump housing lies against a control plate in which in the region of the throughbores a receptacle for the associated end of the actuation element is hollowed out. Preferably, several actuation pistons are used for actuation of a clutch arrangement, the ends of each of which in each case extend into a receptacle of the control plate. Preferably, on tolerance grounds, a guide of the actuation piston in the control plate is dispensed with.

In connection with a positive-displacement pump, especially an internal gear pump, with a pump housing in which an operating fluid is pressurized to move at least one actuation element, especially an actuation piston of a clutch unit, especially of a double clutch unit which is coupled drive-wise with the positive-displacement pump, from an engaged into a disengaged position. A pump element, especially a pump pinion, is rotatably arranged in the pump housing. The object indicated above is furthermore accomplished in that the pump element is rotatably supported on a pedestal bearing. An additional bearing bush can be dispensed with by the direct support of the pump element on the pedestal bearing. The pedestal bearing is made of a sintered material with bearing properties.

A preferred embodiment of the positive-displacement pump is characterized in that a drive element for the pump element is guided and/or supported on the pedestal bearing. With the drive element, it is preferably a matter of at least one drive finger which extends in an axial direction from a clutch unit hub and engages into a complementarily constructed pocket with which the pump element is provided.

A further preferred embodiment of the positive-displacement pump is characterized in that the pedestal bearing includes a pedestal bearing sleeve, which is bounded by a pedestal bearing flange that lies against a stop face. The stop face is preferably constructed in front of a cylindrical depression which is provided in the control plate against which the pump housing lies.

In connection with a positive-displacement pump, especially an internal gear pump, with a pump housing in which an operating fluid is acted upon by pressure, to move at least one actuation element, especially an actuation piston of a clutch unit, especially of a double clutch unit which is coupled drive-wise with the positive-displacement pump, from an engaged into a disengaged position, where a pump element, especially a pump pinion, is rotatably arranged in the pump housing, the above indicated objective is also achieved in that the pump element has a collar extending in the axial direction, through which the pump element is couplable or coupled with a clutch unit hub. A sealing element is arranged in the radial direction between the collar and the pump housing. With the sealing element, it is preferably a matter of a radial shaft seal. The sealing element ensures that no air is sucked in at the interface between the pedestal bearing and the pump element.

A preferred embodiment of the positive-displacement pump is characterized in that the collar is constructed in one piece with the pump element. Preferably, the pump element is constructed in one piece of a sintered material. The pump element can, however, also be produced from a combination of a machined rigid conduit and a sintered gear.

In a clutch unit, especially a double clutch unit, for the arrangement of a drive unit and a transmission in a power train of a motor vehicle, the previously indicated object is achieved in that the clutch unit is coupled with a previously-described positive-displacement pump. As a result of the present invention, an especially economical and overall space-optimized incorporation of the positive-displacement pump into a clutch unit or a transmission is made possible.

BRIEF DESCRIPTION OF THE DRAWINGS

Further advantages, features, and details of the present invention will become apparent from the following descrip- The drawings show.

DESCRIPTION OF THE PREFERRED EMBODIMENTS

The present invention concerns the power train of a motor vehicle in which a double clutch is arranged between a drive unit and a transmission. The drive unit is preferably an internal combustion engine from which an output shaft originates. The transmission is arranged on the opposite side of the power train. The output shaft of the drive unit is non-rotatably connected with a clutch input part which is designated as the clutch input hub. The clutch hub is rotatably supported on the outer periphery of a first input shaft which is constructed as a hollow shaft. A second transmission input shaft is rotatably supported within the hollow first transmission input shaft with the aid of bearings and is constructed as a solid shaft. The structure and function of a double clutch are presumed to be known to those skilled in the art and are therefore not further explained.

Figure 1:
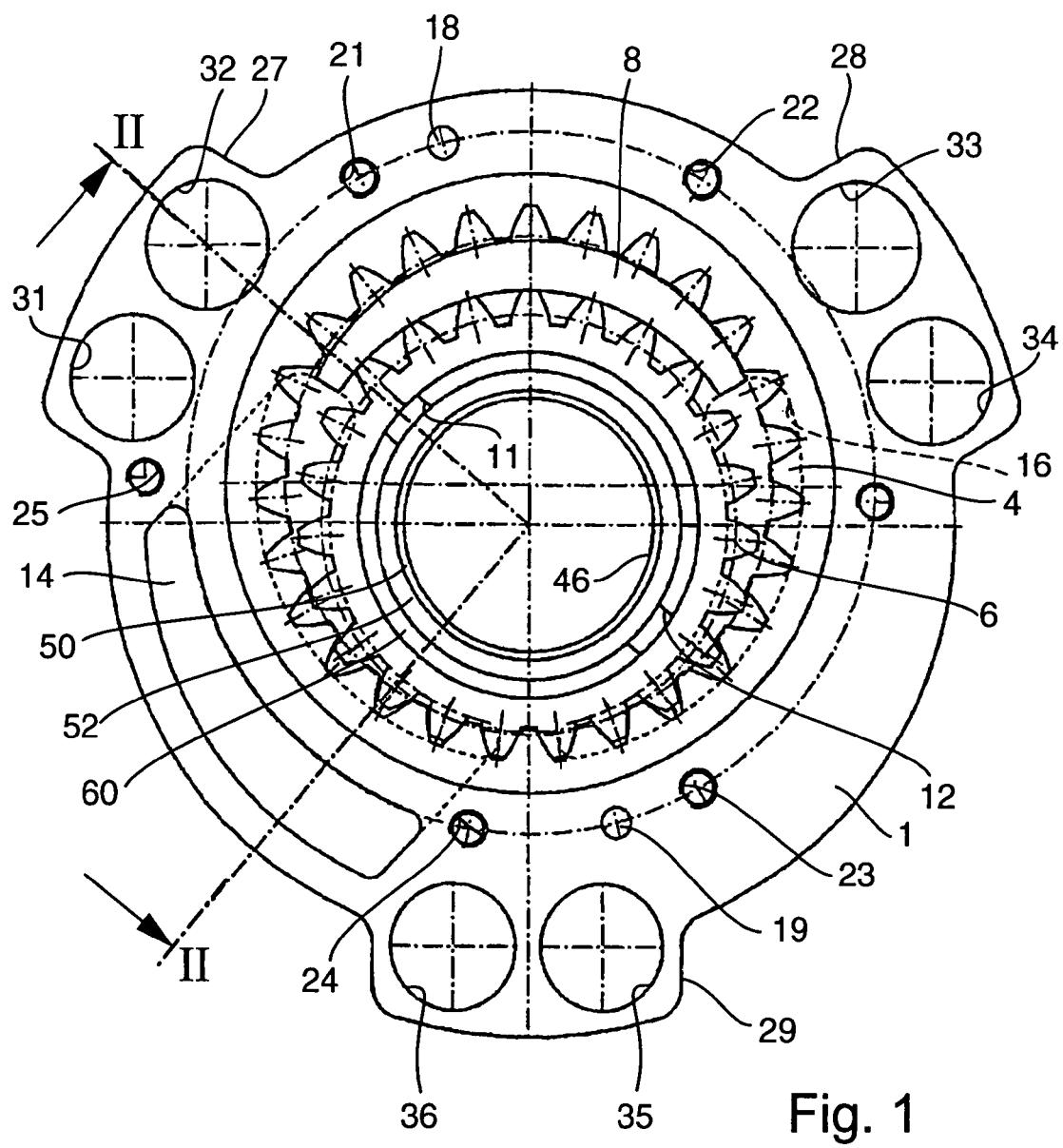
FIG. 1 a view of a cross section through a positive-displacement pump in accordance with an embodiment of the present invention, and FIG. 2 a view of a section along line II-II in FIG. 1.

A positive-displacement pump having a pump housing 1 is shown in cross section in FIG. 1. A pump ring gear 4 is rotatably accommodated in the pump housing 1 which is outfitted with internal teeth. The internal teeth of the pump ring gear 4 are in engagement with the outer teeth of a pump pinion 6, which is rotatably supported eccentrically in relation to the pump ring gear 4. A crescent-shaped space 8 is formed between the pump pinion 6 and the pump ring gear 4.

In the pump pinion 6, radially inner pockets 11, 12 are formed, into which drive fingers engage and are preferably connected in one piece with a (not shown) clutch hub and serve to drive the pump pinion 6, thus to transfer torque from the clutch hub to the pump pinion 6. If the pump pinion 6 and the pump ring gear 4 that is in engagement with it rotate clockwise, then an operating fluid, which is arranged between the pump pinion 6 and the pump ring gear 4, is sucked in in the region of a suction chamber 14 and is acted upon by pressure in the region of a pressure chamber 16 and discharged.

Throughbores 18, 19 are provided radially outwardly of the pump ring gear 4 in the pump housing 1 for accommodating dowel pins. The dowel pins serve to secure the pump housing 1 in the assembled state on a control plate (not shown in FIG. 1). Moreover tapped holes 21 to 26 are provided radially outside the pump ring gear 4 in the pump housing 1 for accommodating fastening means which serve to assemble the pump housing 1. In addition, the pump housing 1 has radially outwardly extending enlargements 27, 28, and 29. Six throughbores 31 to 36 are recessed in the region of the enlargements 27 to 29 in the pump housing 1. Six throughbores 31, 32; 33, 34; 35, 36 are respectively combined in pairs per enlargement 27 to 29. The throughbores 31 to 36 serve to guide actuation pistons (not shown in FIG. 1) which are movable to actuate disk clutch arrangements from an engaged into a disengaged position. Preferably, actuation pistons are arranged in the throughbores 31, 33, 35 for actuating a first disk clutch arrangement. Actuation pistons for actuating a second disk clutch arrangement are preferably arranged in throughbores 32, 34, 36.

Figure 2:
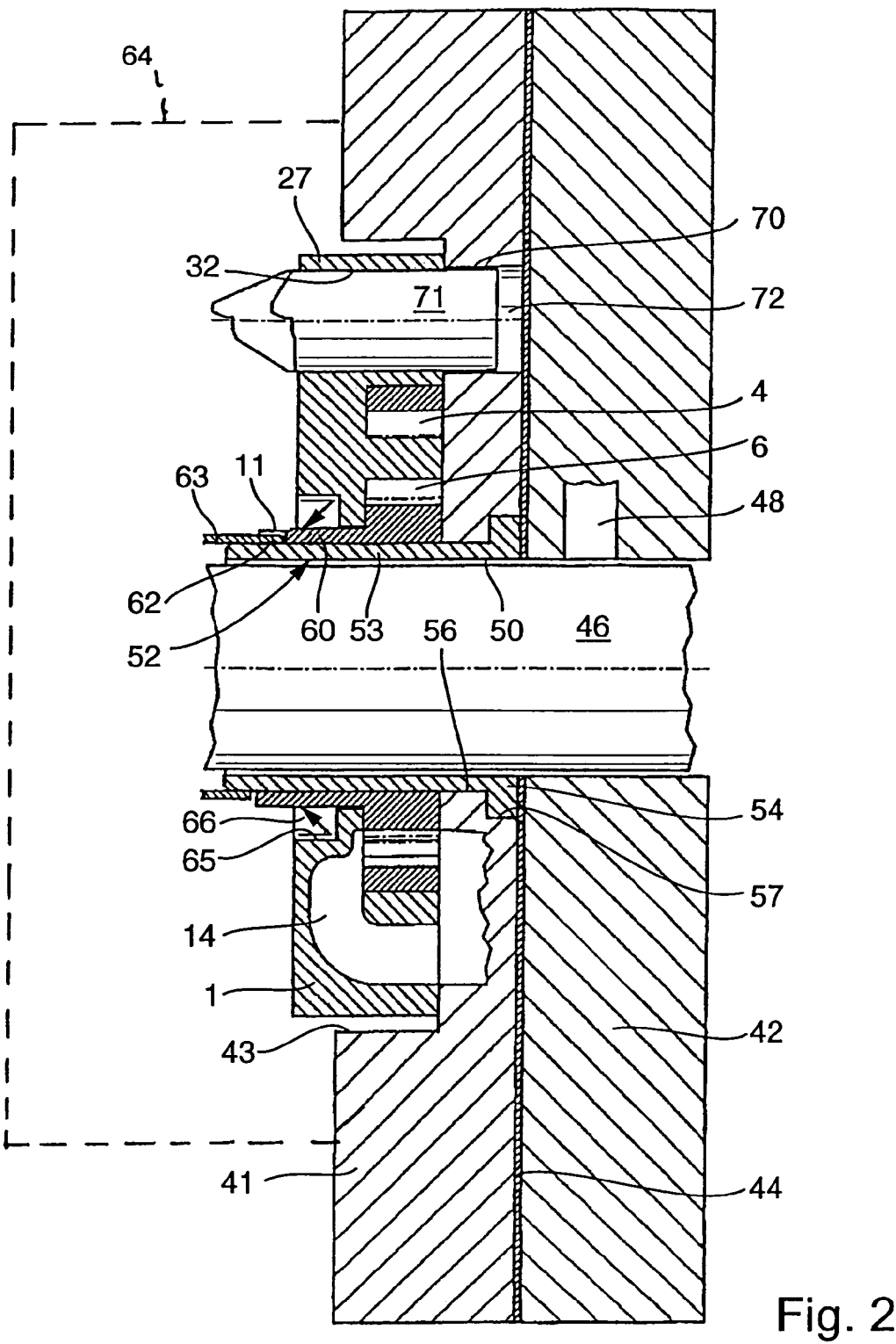

The view of a section along line II-II in FIG. 1 is shown in FIG. 2. In the sectional view, one sees that the pump housing 1 lies with one of its end faces against a first control plate 41. The pump housing 1 is in part accommodated in a recess 43. On the side of the first control plate 41 facing away from the recess 43, lies a second control plate 42. A shim 44 is arranged between the two control plates 41, 42.

The control plates 41, 42 are in each case outfitted with a throughbore through which an input shaft 46 of a (not shown) transmission extends. The input shaft 46 is constructed as a hollow shaft in which a further transmission input shaft, preferably constructed as a solid shaft, is rotatably arranged. The transmission input shaft 46 is surrounded by an annular space 50 which is supplied with a lubricant, preferably with oil, though a lubricant feeding channel 48.

A pedestal bearing 52 is pressed into the first control plate 41. The pedestal bearing 52 includes a pedestal bearing sleeve 53 which basically has the configuration of a circular cylindrical shell. A pedestal bearing flange 54 projects radially outward on one end of the pedestal bearing sleeve 53. The pedestal bearing sleeve 53 is pressed into a throughbore 56 that is hollowed out in the first control plate 41. On the side of the first control plate 41 facing the second control printed circuit plate 42, the throughbore 56 transitions into a section 57 with a larger outer diameter. The section 57 is designated as a cylindrical depression. The cylindrical depression 57 forms a stop for the pedestal bearing flange 54. In that way, the assembly, in particular the pressing in, of the pedestal bearing 52 into the control plate 41 is simplified.

The pump pinion 6 is directly rotatably supported on the pedestal bearing sleeve 53. Radially inward on the side facing away from the second control plate 42, a collar 60 extends from the pump pinion 6 and basically has the configuration of a circular cylindrical shell. On the free end of the collar 60, the two pockets 11, 12 (see FIG. 1) are formed, of which only the pocket 11 is visible in the sectional view shown in FIG. 2. A drive finger 62 engages into the pocket 11 and extends in an axial direction from a torque converter collar 63 which is non-rotatably connected, in particular in one piece, with a clutch hub of a double clutch 64. The torque necessary for driving the pump pinion 6 is transmitted by the drive finger 62 from the output shaft of an internal combustion engine through the clutch hub to the pump pinion 6.

A cylindrical recess 65 is provided in the pump housing 1 between the drive finger 62 and the outer teeth of the pump pinion 6 on the side facing away from the first control plate 41. The cylindrical recess 65 serves to accommodate a radial shaft sealing ring 66, which has at least one sealing lip that lies radially outward against the collar 60 of the pump pinion 6 in a sealing manner.

In the sectional view shown in FIG. 2, one sees that a throughbore 70 is aligned with the throughbore 32 in the pump housing 1 in the first control plate 41. An actuation piston 71 is movably guided axially in the throughbore 32. The free end of the actuation piston 71 extends into the throughbore 70 in the control plate 41. The free end of the actuation piston 71 bounds an operating chamber 72 in the throughbore 70, which stands in connection with the pressure chamber or the pressure space of the internal gear pump shown in FIGS. 1 and 2 through (not shown) connection channels and valves. Through the pressure furnished by the internal gear pump in the operating chamber 72, the actuation piston 71 can be moved out of the engaged position shown into a (not shown) disengaged position to actuate the associated clutch arrangement.

With the throughbores 31 to 36, it is a question of boreholes which are incorporated into the pump housing 1. Thereby radial construction space can be saved. The boreholes are executed as easily produced throughbores. In the non-actuated state, the actuation pistons for the clutch extend into the control plate 41. For reasons of tolerance, a guiding of the actuation piston 71 in the throughbore 70 in the control plate 41 is dispensed with. In that way, it is assured that sufficient guide length is present even in the disengaged state of the piston. Alternatively, a local thickening of the pump housing in the region of the piston bores 31 to 36 is also conceivable. In that case, submerging the actuation piston 71 into the control plate 41 can be wholly or partially dispensed with.

In order to be able to save axial construction space, the actuation mechanism can also locally extend into the pump housing 1 according to the actuation position. The extension can be made possible either by local processing of the pump housing 1 or through corresponding configuration of the cast periphery of the housing 1.

The pump pinion 6 is supported on the pedestal bearing sleeve 53. The pedestal bearing 52 is preferably made of a sintered material with sliding bearing properties. In addition to supporting the pump pinion 6, the pedestal bearing sleeve 53 also takes over the guiding and/or supporting of the pump drive, especially of the drive finger 62 extending from the torque converter collar 63. The bearing site between the pedestal bearing 52 and the pump drive 63 at the same time represents a sealing site for an oil flow, which can be present between the pedestal bearing 52 and the pump drive 63 in region 50.

A part of the actuation apparatus of a double clutch transmission is incorporated into the pump housing in accordance with the present invention. The pedestal bearing 52 also assumes the support of the drive and a sealing function in addition to supporting the pump. The pump is sealed off toward the outside through the collar 60 on the pump pinion 6 by the radial shaft seal 66.

What is claimed is:

1. A positive-displacement internal gear pump comprising: a pump housing in which an operating fluid is acted upon by pressure in order to move at least one actuation piston of a clutch unit, wherein the clutch unit is drivingly coupled with the pump for movement from an engaged into a disengaged position, wherein pairs of throughbores for accommodating different ones of said at least one actuation piston that are associated with different of said clutch units are arranged evenly peripherally distributed over the pump housing.

2. The positive-displacement pump according to claim 1, wherein the pump housing rests against a control plate in which a receptacle for an associated end of at least one actuation piston is recessed in the region of the associated throughbore.

3. The positive-displacement internal gear pump according to claim 1, including a pump pinion rotatably arranged in the pump housing and rotatably carried on a pedestal bearing.

4. The positive-displacement pump according to claim 3, including a drive element for the pump pinion supported on the pedestal bearing.

5. The positive-displacement pump according to claim 4, wherein the pedestal bearing includes a pedestal bearing sleeve bounded by a pedestal bearing end flange that is in engagement with a stop face of an adjacent plate.

6. The positive-displacement internal gear pump according to claim 3, wherein the pump pinion includes a collar extending in an axial direction through which the pump pinion is coupled with a clutch unit hub, and wherein a sealing element is arranged in a radial direction between the collar and the pump housing.

7. The positive-displacement pump according to claim 6, wherein the collar is constructed in one piece with the pump pinion.

8. The clutch unit for arrangement in a power train of a motor vehicle between a drive unit and a transmission, whereby the clutch unit is coupled with the positive-displacement pump as claimed in claim 1.

9. The positive-displacement pump according to claim 1, wherein the clutch unit is a double clutch unit.

10. The positive-displacement pump according to claim 4, wherein the clutch unit is a double clutch unit.

11. The positive-displacement pump according to claim 6, wherein the clutch unit is a double clutch unit.

12. The clutch unit according to claim 8, wherein the clutch unit is a double clutch unit.

* * * * *